(12) United States Patent
Ohmi et al.

(10) Patent No.: US 7,472,887 B2
(45) Date of Patent: Jan. 6, 2009

(54) VALVE FOR VACUUM EXHAUSTION SYSTEM

(75) Inventors: Tadahiro Ohmi, Sendai (JP); Nobukazu Ikeda, Osaka (JP); Michio Yamaji, Osaka (JP); Masafumi Kitano, Osaka (JP); Akihiro Morimoto, Osaka (JP)

(73) Assignee: Fujikin Incorporated, Osaka (JP)

( * ) Notice: Subject to any disclaimer, the term of this patent is extended or adjusted under 35 U.S.C. 154(b) by 81 days.

(21) Appl. No.: 10/545,672

(22) PCT Filed: Feb. 9, 2004

(86) PCT No.: PCT/JP2004/001352

§ 371 (c)(1),
(2), (4) Date: Aug. 15, 2005

(87) PCT Pub. No.: WO2004/072519

PCT Pub. Date: Aug. 26, 2004

(65) Prior Publication Data

US 2006/0071192 A1    Apr. 6, 2006

(30) Foreign Application Priority Data

Feb. 13, 2003    (JP) ............................ 2003-034762

(51) Int. Cl.
    *F16K 7/17*    (2006.01)
(52) U.S. Cl. .................................. 251/331; 251/368
(58) Field of Classification Search ............... 251/331, 251/61, 368; 137/375
    See application file for complete search history.

(56) References Cited

U.S. PATENT DOCUMENTS

| 3,750,698 | A | * | 8/1973 | Walchie et al. ............... 137/375 |
| 4,317,713 | A | * | 3/1982 | Burk et al. ................... 208/113 |
| 4,337,144 | A | * | 6/1982 | Yoo ........................ 208/120.01 |
| 4,686,155 | A | * | 8/1987 | Kilbane et al. ............... 428/653 |
| 5,127,430 | A | * | 7/1992 | Powers et al. ................ 137/375 |

(Continued)

FOREIGN PATENT DOCUMENTS

JP    62-191078 A    8/1987

(Continued)

OTHER PUBLICATIONS

International Search Report issued in the corresponding application PCT/JP2004/001352 completed Mar. 25, 2004 and mailed Apr. 6, 2004.

*Primary Examiner*—John Rivell
*Assistant Examiner*—Cloud K Lee
(74) *Attorney, Agent, or Firm*—Griffin & Szipl, P.C.

(57) ABSTRACT

The present invention provides a valve which makes it possible to reduce the diameter of the vacuum exhaustion pipings for making the facility for the vacuum exhaustion system small, as a result lowering the costs, and making the vacuum exhaustion time short, and also which can prevent the corrosions, cloggings, and seal leakages inside the piping system caused by the accumulation of substances produced by the decomposition of the gas.

Specifically, the aluminum passivation is applied on the piping parts, i.e. the valve and others, used in the vacuum exhaustion system to inhibit the gas decomposition caused by the temperature rise at the time of the baking so that components for the reduction in the diameter size in the vacuum exhaustion system are provided. The corrosions, cloggings and seat leakages caused by the gas decomposition are prevented.

10 Claims, 6 Drawing Sheets

U.S. PATENT DOCUMENTS

| | | | | |
|---|---|---|---|---|
| 5,165,655 | A | * | 11/1992 | Drexel et al. ............ 251/129.02 |
| 5,413,311 | A | | 5/1995 | Arstein et al. |
| 5,658,452 | A | * | 5/1995 | Arstein et al. ................ 251/331 |
| 5,520,213 | A | | 5/1996 | Muller |
| 5,820,105 | A | * | 10/1998 | Yamaji et al. ................ 251/368 |
| 5,836,568 | A | * | 11/1998 | Ishigaki et al. ............... 251/148 |
| 6,409,149 | B1 | * | 6/2002 | Maher, Jr. .................... 251/328 |
| 6,941,963 | B2 | * | 9/2005 | Maula et al. .................... 137/1 |
| 2004/0118455 | A1 | * | 6/2004 | Welty et al. ................. 137/375 |
| 2005/0285064 | A1 | * | 12/2005 | Yoshino et al. ............ 251/61.5 |

FOREIGN PATENT DOCUMENTS

| | | |
|---|---|---|
| JP | 10-2452 A | 1/1998 |
| JP | 11-118049 A | 4/1999 |
| JP | 2000-227168 A | 8/2000 |
| JP | 2001-295946 A | 10/2001 |
| JP | 3343313 B2 | 8/2002 |
| JP | 2002-323147 A | 11/2002 |

* cited by examiner

VALVE FOR VACUUM EXHAUSTION SYSTEM

This is a National Phase Application in the U.S. of International Patent Application No. PCT/JP2004/001352 filed Feb. 9, 2004, which claims priority on Japanese Patent Application No. 2003-034762, filed Feb. 13, 2003. The entire disclosures of the above patent applications are hereby incorporated by reference.

FIELD OF THE INVENTION

The present invention is concerned with a valve to be used in the fluid control device and the like in the semiconductor manufacturing equipment. More particularly, the present invention is concerned with a valve to be used in the system for the exhaustion from the process chamber employed in the semiconductor manufacturing.

BACKGROUND OF THE INVENTION

Generally, a gas having high chemical reactivity is supplied to the process chamber used in the semiconductor manufacturing facilities, the chemicals manufacturing facilities and the like. Accordingly, the exhaustion system for the process chamber is required to exhaust high reactivity gases in safety and with a high degree of efficiency.

Therefore, to conduct an efficient exhaustion from the process chamber, it is necessary to employ an exhaustion pump with a high compression ratio, which can exhaust at a high exhaustion velocity (1/min) even if the suction pressure is low. However, in reality, the vacuum exhaustion pump having a high compression ratio is not easily available. Accordingly, it is necessary for the conventional exhaustion system for the process chamber to overcome two problems, one that the gas is to be exhausted with a high degree of efficiency using a pump having a relatively low compression ratio, and the other that the overload on the pump is to be avoided by keeping small the pressure difference between the primary side and the secondary side of the exhaustion system. To solve the two problems, the diameter of the pipings for the exhaustion is made large (a nominal diameter of approx. 4 inches) so that the conductance of the pipe passage is great. For the same reason, the valve having a large diameter is employed.

The fluid flow is classified into two regions, a viscous flow region and a molecular flow region in regard to the relationship between the pressure and the inside diameter of the flow passage. To conduct an efficient exhaustion, it is required that the exhaustion be conducted in the viscous flow region. To achieve the viscous flow region, the inside diameter D of the flow passage should be $L \leq D$ (where L: the mean free path of gas molecules and D: the inside diameter of the flow passage). Further, there exists the relationship, $L = 4.98 \times 10^{-3}/P$, between the mean free path L and the pressure P.

The relationship between the pressure and the inside diameter to attain the viscous flow region inside the pipings is shown above. By raising the pressure higher, the mean free path L can be made smaller with the result that the inside diameter D of the pipings to attain the viscous flow region can be made small.

However, as stated above, since the conventional pump has a comparatively small compression ratio (approx. 10), it is not possible to raise the pressure on the discharge outlet side. For example, when the pressure on the chamber side (the primary side) is $10^{-3}$ Torr, the discharge outlet side pressure becomes as low as approx. $10^{-2}$ Torr. This means that the pipings having the inside diameter of 5 cm or larger is required to attain the viscous flow region with more certainty.

As a result, with the conventional vacuum exhaustion system, there is a problem that since the piping system having a large diameter has been required, the facility is forced to be large in size. At the same time, there is another problem that since a larger inside diameter of the vacuum piping system results in a larger volume inside the pipings, it takes a long time for the vacuum exhaustion. Furthermore, there is another problem that to conduct an efficient exhaustion in a short time with the small-sized vacuum exhaustion system, an expensive, high-performance vacuum pump having a large compression ratio and a high exhaustion velocity is needed.

On the other hand, with the vacuum exhaustion system, the dissociation (decomposition) of gases retained inside the pipings occurs when the vacuum pump is out of operation for a long time, thus causing the corrosions of the pipings resulting from the precipitation of substances produced by the decomposition inside the pipings. Particularly, when the substances, water and moisture produced by the dissociation of gases inside the pipings accumulate and adhere on the inside walls of the pipings and the piping parts of the valves, not only the afore-mentioned corrosion problem but also the cloggings and valve seat leakages occur.

If the piping system is heated, the risk of causing the corrosions and the like is reduced because there will be less chance of water and moisture adherence along with the temperature rise.

However, if the temperature is raised inside the pipings, the dissociation (decomposition) of gases is caused such that the substances produced by the decomposition deposit and accumulate inside the pipings, causing the corrosions, cloggings and valve seat leakages.

OBJECT OF THE INVENTION

It is a primary object of the present invention to provide a valve which makes it possible to reduce the diameter of the vacuum exhaustion pipings for making the facility for the vacuum exhaustion system small-sized, lowering the costs, and making the vacuum exhaustion time short, and also which can prevent the dissociation and decomposition of gases, and the occurrence of corrosions, cloggings, and valve seat leakages inside the piping system caused by the accumulation of the substances produced by the dissociation of gases.

DISCLOSURE OF THE INVENTION

Generally, a gas having high chemical reactivity is supplied to the process chamber used in the semiconductor manufacturing facilities, chemical products manufacturing facilities and the like. Accordingly, the exhaustion system for the process chamber is required to exhaust the high reactivity gases in safety and with a high degree of efficiency.

The piping system in the semiconductor manufacturing facilities normally comprises a system to supply a gas to the process chamber, the process chamber, the vacuum exhaustion system, the vacuum pump, the valves and the like. A plurality of pumps are employed for the exhaustion: i.e., a primary pump (the high vacuum type pump) installed immediately after the chamber, and a secondary pump (the low vacuum type pump) installed on the secondary side of the afore-mentioned primary pump. A turbo molecular pump (TMP) is used for the high vacuum type pump, while a scroll type pump is used for the low vacuum pump. Also, as stated above, the pipings having a diameter of 5 cm or more is employed for the pipings in the exhaustion system.

In recent years, however, the pump having a high performance capability, or specifically the one which achieves a high compression ratio of approx. $10^3$-$10^4$ has been developed. This has made it possible to increase the discharge side pressure of the primary pump to approx. 30~50 Torr even when the inside pressure of the process chamber is around $10^{-3}$ Torr. Accordingly, by optimizing the pressure conditions of the process chamber and the vacuum exhaustion system, the inside diameter of the pipings can be made small such that it is possible to sufficiently secure the viscous flow region with the pipings having a small inside diameter, for instance, an inside diameter of approx. 0.5 cm.

However, in the event that the pressure is increased as such, there is a possibility that water, moisture and gases condense in the vacuum exhaustion system and adhere inside the pipings. Even if the condensation and adherence of water, moisture caused by the set pressure rise do not occur, the dissociation (decomposition) of gases retained and trapped inside the pipings when the vacuum pump is out of operation may occur with the result that the substances produced by the dissociation deposit and accumulate inside the pipings and the piping parts of the valve, causing the corrosions of the materials, cloggings and valve seat leakages.

Hence, it is necessary to keep the inside of the piping system lower than the saturated vapor pressure of gases, water or moisture. With the vacuum exhaustion system, the heating is normally effected for such purpose. (In case of water, the saturated vapor pressure is 17.53 Torr at 20° C.) That is, the saturated vapor pressure rises when the temperature rises by heating, making it difficult for the condensation and adherence of water, moisture and gases to occur with the result that the risk of occurrence of the corrosions and the like is reduced. Accordingly, as is known, it is desirable to raise the temperature to approx. 150° C., taking the kinds of the components of the gas inside the vacuum exhaustion system into consideration.

However, as mentioned above, the gases are dissociated when the temperature rises. Here comes another problem that the substances produced by the dissociation deposit on and adhere to the inside of the pipings, thus resulting in the corrosions.

It is known that the afore-mentioned dissociation (decomposition) is caused by the catalytic action of metal components of the inside wall of the pipings.

Figure 1:
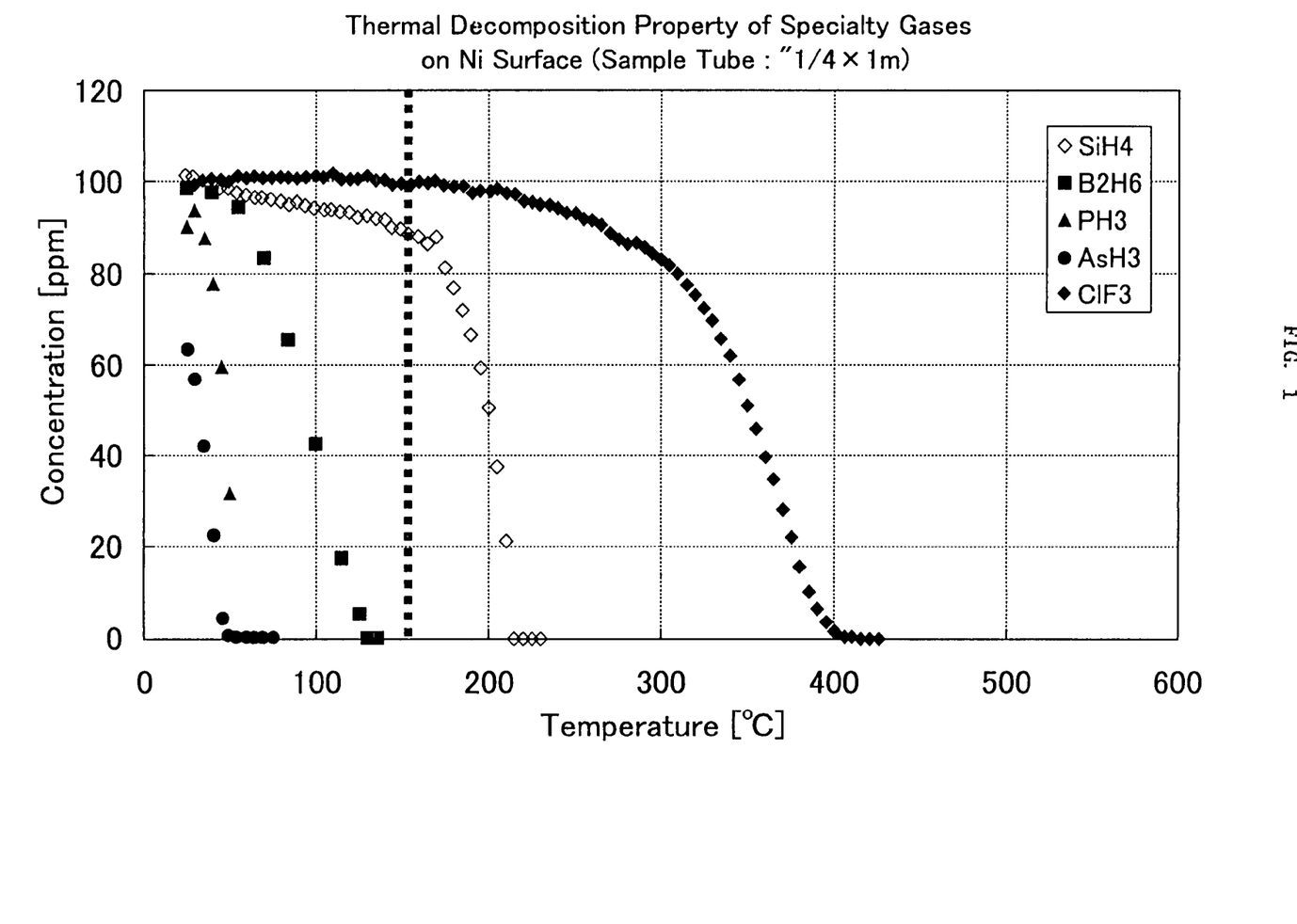
FIG. 1 illustrates the relation between the temperature and the decomposition of various gases used for the semiconductor manufacturing in the case of Ni.

The inventors of the present invention have, therefore, looked into the materials (metal materials) of the pipings, the gas temperature and the dissociation (decomposition) of gases with regard to various kinds of gases commonly used in the semiconductor manufacturing field as shown in FIG. 1.

FIG. 1 illustrates the relation between the temperature and the dissociation (decomposition) of various gases in the case of Ni. It is shown that the gases which are 100 ppm at the room temperature are decomposed and reduced in the concentration as the temperature rises.

Figure 2:
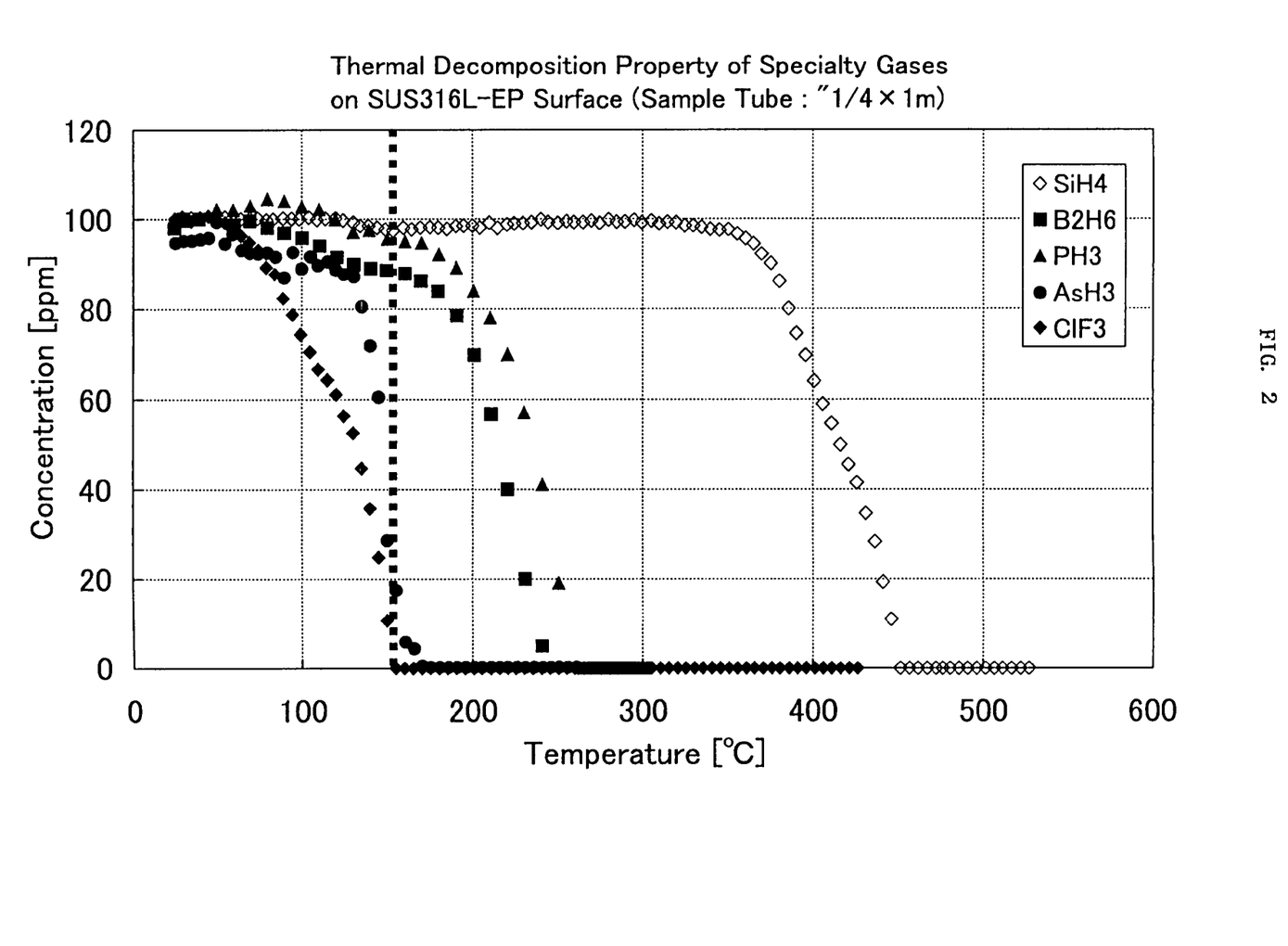
FIG. 2 illustrates the relation between the temperature and the decomposition of various gases used for the semiconductor manufacturing in the case of SUS316L.

Similarly, FIG. 2 illustrates the case of SUS316L. As shown in FIG. 2, the dissociation (decomposition) of nearly all gases occurs at the temperature lower than 150° C. To inhibit the decomposition and dissociation of the gases, it is necessary to prevent the metal surface of the inner wall of the vacuum pipings from exhibiting the catalytic effects.

Particularly, the valve has more curvatures and areas where the gas remains or is trapped than the pipings such that the valve has parts where the pressure and temperature are changed locally and partially. In addition, with the valves, a large inside volume results in a large volume of the trapped gas. Further, large inside surface areas might give the valve a lot of chances of having the corrosions, cloggings and valve seat leakages caused by the deposition and adherence of the substances produced by the dissociation of the gas.

The inventors of the present invention have found a way of inhibiting the gas dissociation (decomposition) and preventing the corrosions, cloggings, and valve seat leakages caused by the deposition and adherence of the substances produced by the dissociation where the metal parts such as the inner walls of the pipings which contact the fluid are passivated so that the catalytic action is not exerted, thus inhibiting the dissociation and decomposition of the gas.

It is known that stainless steel naturally forms an oxide film on the surface, thus making it passivated. However, since the naturally-formed passivity film contains ferrous oxide, the film has a problem in regard to the corrosion resistance as well as the function of the passivity film.

There exist various types of passivation which inhibit the dissociation (decomposition) of gases nearly perfectly with no catalytic action occurring. According to the results of the tests conducted by inventors, as shown in FIG. 3 and FIG. 4, the passivation with mainly $Cr_2O_3$ (chromium passivation) and the passivity with mainly $Al_2O_3$ (aluminum passivation) are preferable.

Figure 3:
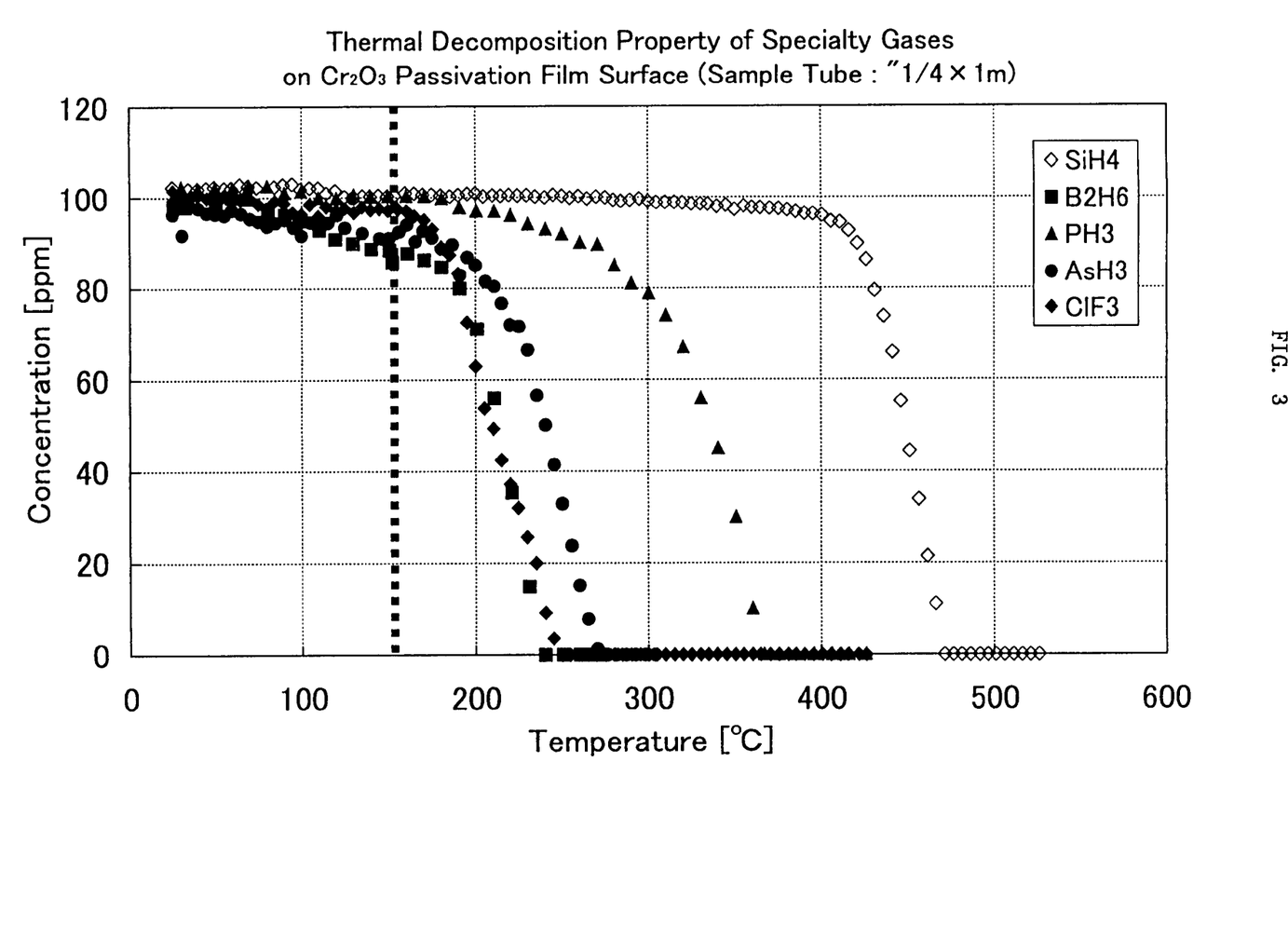
FIG. 3 illustrates the relation between temperature and the decomposition of various gases used for the semiconductor manufacturing in the case of the chromium passivation.

In the case of the chromium passivity, as illustrated in FIG. 3, there exist gases which start the decomposition even in the range lower than 150° C. It is sufficient in some cases that the decomposition of gases is inhibited to this degree. However, it has been learned that the aluminum passivation is more suitable to inhibit the decomposition of gases when temperature rises further.

Figure 4:
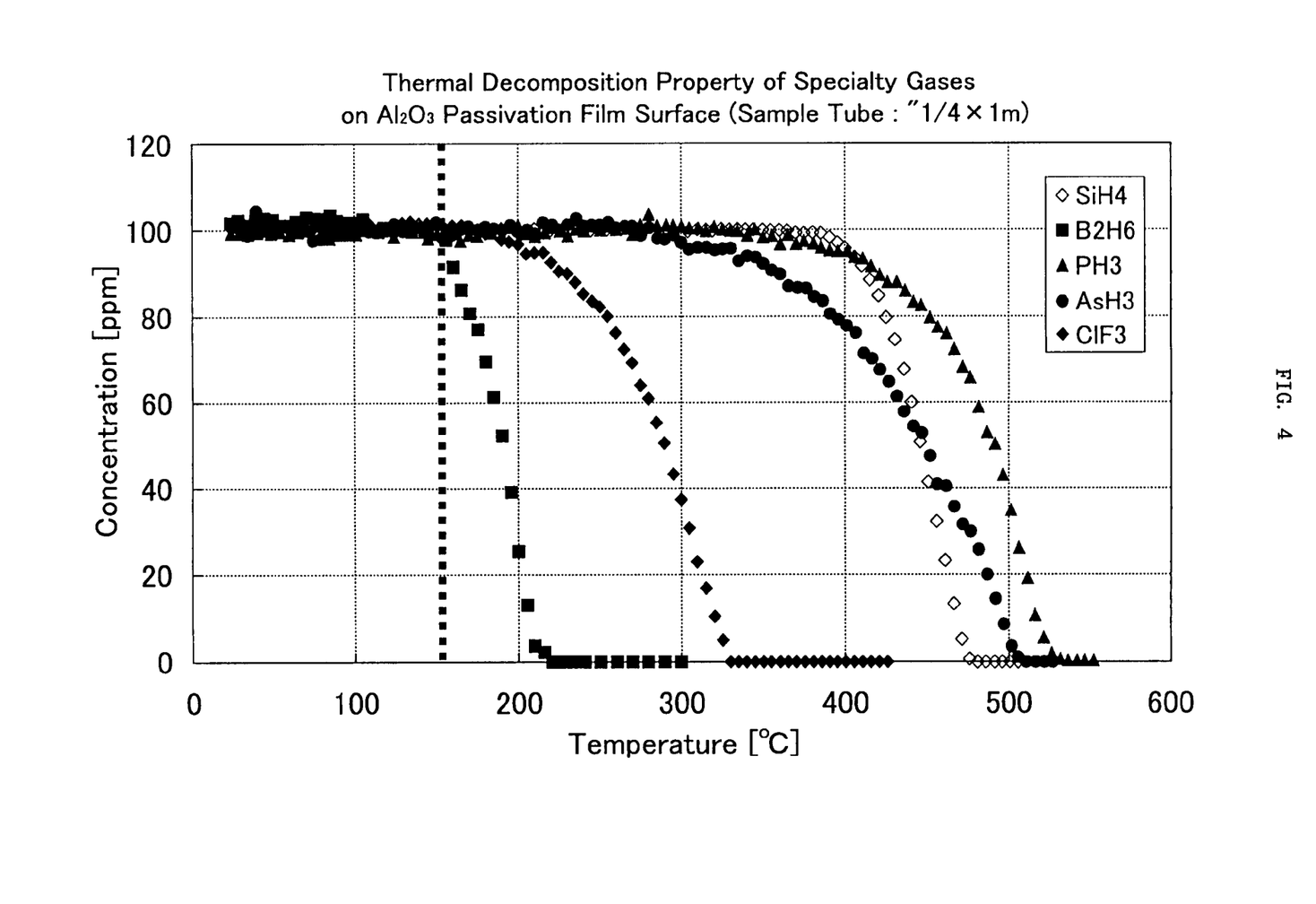
FIG. 4 illustrates the relation between temperature and the decomposition of various gases used for semiconductor manufacturing in the case of the aluminum passivation.

As illustrated in FIG. 4, the aluminum passivation does not allow the decomposition of gases to occur up to approx. 150° C. The aluminum passivation in this case was one with mainly $Al_2O_3$ (alumina).

The aluminum passivation can be formed by the method in which the oxidation, heating or a combination of the both is applied on the surface of aluminum-made parts; or similarly by the method in which the oxidation, heating or a combination of the both is applied on the surface of suitable aluminum-containing alloys such as aluminum alloys and the like; or by the method in which the layer of suitable aluminum-containing alloys such as aluminum alloys and the like is formed by plating or coating on the parts where the passivation is needed, and then, the passivation is applied by oxidation, heating or a combination of the both.

Metal materials which constitute a base material of the valve are not limited to aluminum or aluminum alloys containing mainly aluminum. For example, austenitic stainless steel containing some weight percent (3~8%) of aluminum can be used because it is confirmed that the aluminum passivation film containing mainly $Al_2O_3$ can be formed on the outer surface of the base material by applying the heat treatment. According to the present invention, the dissociation (decomposition) of gases caused by the temperature rise at the time of baking can be inhibited by forming the aluminum passivation on the fluid-contacting inner surfaces of the piping parts of the valve or the like used in the vacuum exhaustion system, thus making it possible to provide the parts which allow the diameter of the pipings in the vacuum exhaustion system to be small, more particularly to provide the valve which prevent the corrosions, cloggings, valve seat leakages and the likes caused by the substances produced by the decomposition.

It is confirmed that the aluminum passivation containing $Al_2O_3$ or containing mainly $Al_2O_3$ is a preferred aluminum passivity in order to prevent the catalytic action of the metal surface and improve the durability.

The present invention has been created through the aforementioned process. The present invention, in accordance with a first embodiment, relates to a valve which comprises a body having a valve seat formed on the bottom face of a valve chamber being in communication with a flow-in passage and a flow-out passage, a valve body allowed to rest on and move away from the afore-mentioned valve seat, and a driving means operating to allow the afore-mentioned valve body to rest on or move away from the valve seat for closing or opening the flow passage so that fluid flow is controlled wherein the aluminum passivation is applied at least on the surfaces of the body which come in contact with fluids.

The present invention, in accordance with a second embodiment, relates to a valve in accordance with the first embodiment wherein materials of the members on which the aluminum passivation is applied are aluminum, aluminum alloys or austenitic stainless steel which contains some weight percent of aluminum.

The present invention, in accordance with a third embodiment, relates to a valve accordance with the first embodiment wherein the aluminum passivation is applied on the entire parts of the valve body which come in contact with fluids. In other words, in accordance with the third embodiment, a valve in a vacuum exhaustion system is provided that comprises a body having a valve seat formed on the bottom face of a valve chamber that is in communication with a flow-in passage and a flow-out passage, a valve body permitted to rest on or move away from the afore-mentioned valve seat, and a driving means operating to allow the afore-mentioned valve body to rest on or move away from the valve seat such that the fluid passage is closed or opened for controlling the fluid by allowing the valve body to rest on and move away from the valve seat wherein the aluminum passivation is applied at least on the surfaces of the body which come in contact with fluids and on the entire parts of the valve body which come in contact with fluids.

The present invention, in accordance with a fourth embodiment, relates to a valve as in accordance with the first embodiment wherein the thickness of the aluminum passivation is not less than 20 nm.

The present invention, in accordance with a fifth embodiment, relates to a valve in accordance with the first through fourth embodiments inclusive, wherein the aluminum passivation is the aluminum passivity containing mainly $Al_2O_3$.

The present invention, in accordance with a sixth embodiment, relates to a valve as in accordance with the first embodiment wherein the valve body is a metal diaphragm valve body whose fluids-contacting parts are coated with a fluorine-contained resin film.

The present invention, in accordance with a seventh embodiment, relates to a valve in accordance with a first embodiment wherein the flow passage in the valve has the inside diameter which permits the fluids in the flow passage to form a viscous flow.

The present invention, in accordance with an eighth embodiment, relates to a valve in accordance with a first embodiment wherein the inside diameter of the flow passage in the valve is not more than 12 mm.

The present invention, in accordance with a ninth embodiment, relates to a valve in accordance with the first embodiment wherein it is possible to heat the flow passage part to 150° C.

The present invention, in accordance with a tenth embodiment, relates to a valve in accordance with the sixth embodiment wherein the fluorine-contained resin film for coating the valve body is made of polytetrafluoroethylene resin (PTFE), fluorinated ethylene-propylene copolymer (FEP), or tetrafluoroethylelne-perfluoroalkylevinyl ether copolymer (PFA).

LIST OF REFERENCE NUMERALS 1 a valve
2 a body
3 a diaphragm
4 a driving means
5 a flow-in passage
6 a flow-out passage
7 a valve chamber
8 a valve seat
12 a 4-gang valve
13 a flow-in passage
14 a flow-out passage
15 a flow-in passage
16 a flow-in passage
17 a flow-out passage

BEST MODE OF CARRYING OUT THE INVENTION

The embodiment in accordance with the present invention is described hereunder with reference to the drawings.

Figure 5:
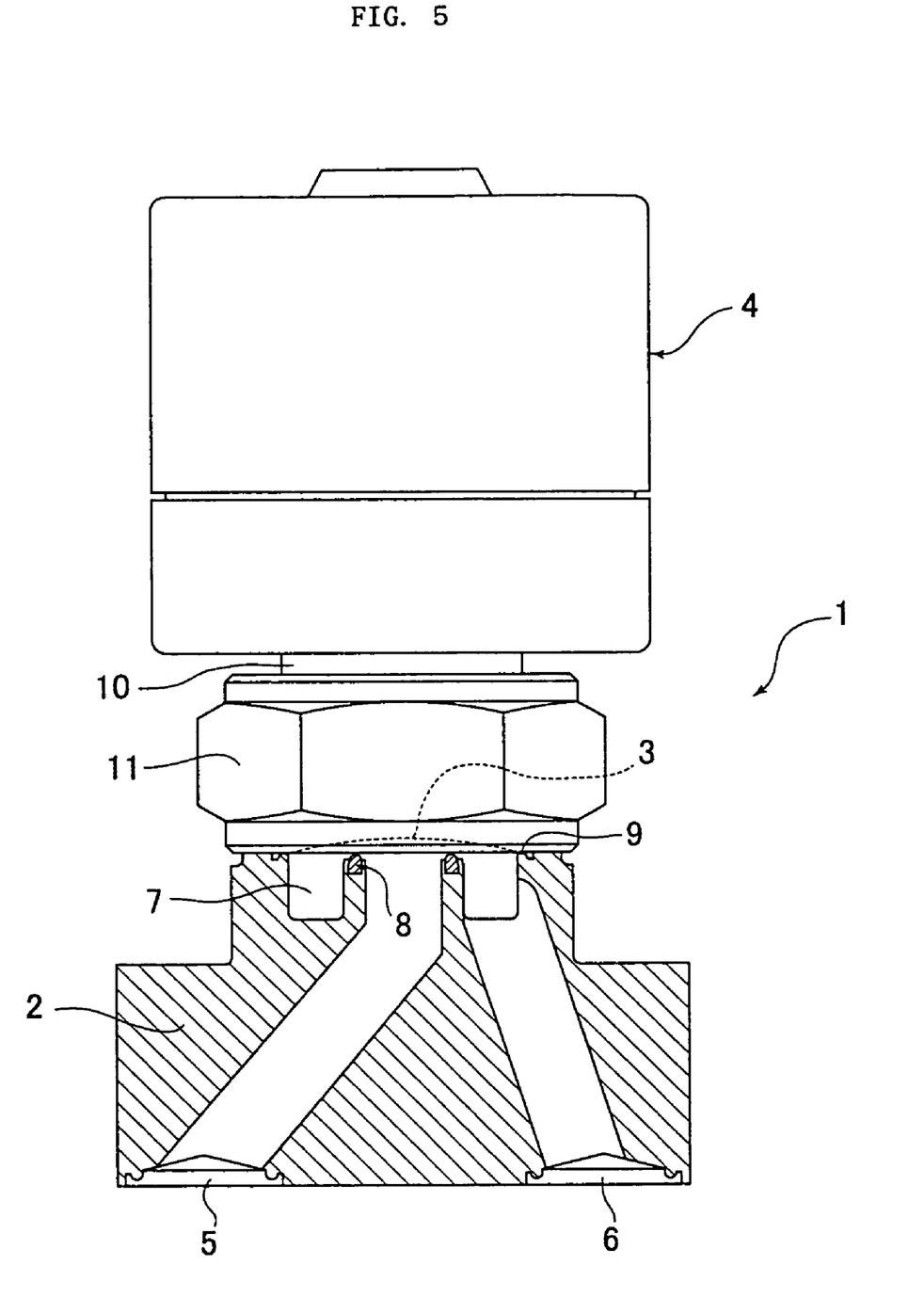
FIG. 5 is a vertical sectional view of the valve according to the present invention.

FIG. 5 is a vertical sectional view of the valve in accordance with the present invention, which is a type of valve called a metal diaphragm valve.

A major part of the metal diaphragm valve 1 comprises a body 2, a metal diaphragm valve body 3, and a driving means 4.

The body 2 is provided with a valve seat 8 which is formed on the bottom face of a valve chamber 7 in communication with a flow-in passage 5 and a flow-out passage 6. The body 2 is made of aluminum, aluminum alloys and the like. The body 2 is further provided with a concave-shaped valve chamber 7 opened in the upward direction, a flow-in passage 5 opening downward and being in communication with the valve chamber 7, a flow-out passage 6 opening downward and being in communication with the valve chamber 7, a valve seat 8 made of synthetic resin and the like and fitted into and secured to the center of the bottom face of the valve chamber 7, and a step part 9 formed in the periphery of the bottom face of the valve chamber 7. Both the flow-in passage 5 and flow-out passage 6 are shaped circular in its cross section.

The metal diaphragm 3 is mounted in the body 2 to make the valve chamber 7 air-tight. The metal diaphragm 3 with its center part expanding upward is formed in the dish shape of an elastically deformable, thin metal plate such as stainless steel. Its peripheral part is mounted on the step part 9 of the body 2 and is pressed against the step part 9 by a lower end part of a bonnet 10 inserted into the valve chamber 7 and a bonnet nut 11 screwed on the body 2 such that the metal diaphragm 3 is secured air-tightly.

The center part of the metal diaphragm 3 is allowed to rest on and move away from the valve seat 8 to close and open the valve.

The bonnet 10 cylindrically shaped and inserted into the valve chamber 7 of the body 2 is pressed against the body 2 and secured by tightening the bonnet nut 11. The driving means 4 which is of the pneumatic type allows the metal diaphragm 3 to rest on the valve seat 8 and to return of itself to the original shape for moving away from the valve seat 8.

The inside diameters of the flow-in passage 5 and the flow-out passage 6 are 8 mm, and both passages are connected to the pipings having the outside diameter of 9.52 mm.

In the event that the aluminum passivation is applied on the liquid-contact parts of the diaphragm too, the aluminum-made or aluminum alloy-made diaphragm can be used.

Also, the passivation can be applied on the aluminum or aluminum alloy layer which is formed by plating or coating on the surface of stainless steel or other special metals.

Furthermore, although the pneumatic type driving means 4 is employed in the above example, the driving means 4 need not be of the pneumatic type. For example, a manual type one, an electromagnetic type one, an electric type one or a hydraulic type one can be employed instead. Also, although the diaphragm valve is employed in the above example, other types of valve will do too.

In the afore-mentioned embodiment, the explanation was given assuming that the body 2 is made of aluminum or an alloy containing mainly aluminum. However, austenitic stainless steel containing some weight percent (3~8 weight percent) of aluminum can be used for the body.

It is confirmed that a film of 20-200 nm thick containing mainly $Al_2O_3$ can be formed on the surface of the above mentioned austenitic stainless steel containing some percent of aluminum, if properly heat-treated.

Also, with the aluminum passivation, any aluminum oxide such as alumite or anodized aluminum, for example, can be employed, not limited to the afore-mentioned $Al_2O_3$.

Furthermore, the most suitable thickness of the aluminum passivation is approx. 20~200 nm. The durability is feared if the thickness is less than 20 nm while the high costs for forming the passivation may be a drawback and the mechanical strength of the aluminum passivation may cause a problem if the thickness is more than 200 nm.

In addition, in the afore-mentioned embodiment, the aluminum passivation is directly formed on the diaphragm 3 which is a part of the metal diaphragm valve 1. However, since the metal diaphragm is repeatedly bent to rest on and move away from the valve seat 8, the aluminum passivation may be mechanically damaged.

Accordingly, a film of the fluorine-contained resin (i.e., Teflon, (a registered trade mark) such as FEP•fluorinated ethylene-propylene copolymer, PTFE•polytetrafluoroethylene resin, PFA•tetrafluoroethylene-perfluoroalkylvinylether copolymer and the like) can be formed on the lower face of the metal diaphragm 3 which contacts the liquids. This is because the fluorine-contained resin film is elastic enough to withstand the repeated bending of the diaphragm 3, and can completely prevent the catalytic action of metals which causes the dissociation and decomposition of gases, and also can withstand high temperature of approx. 150° C. adequately.

The afore-mentioned diaphragm valve of the embodiment is employed in the vacuum exhaustion system between the process chamber and the primary pump and between the primary pump and the secondary pump.

Figure 6:
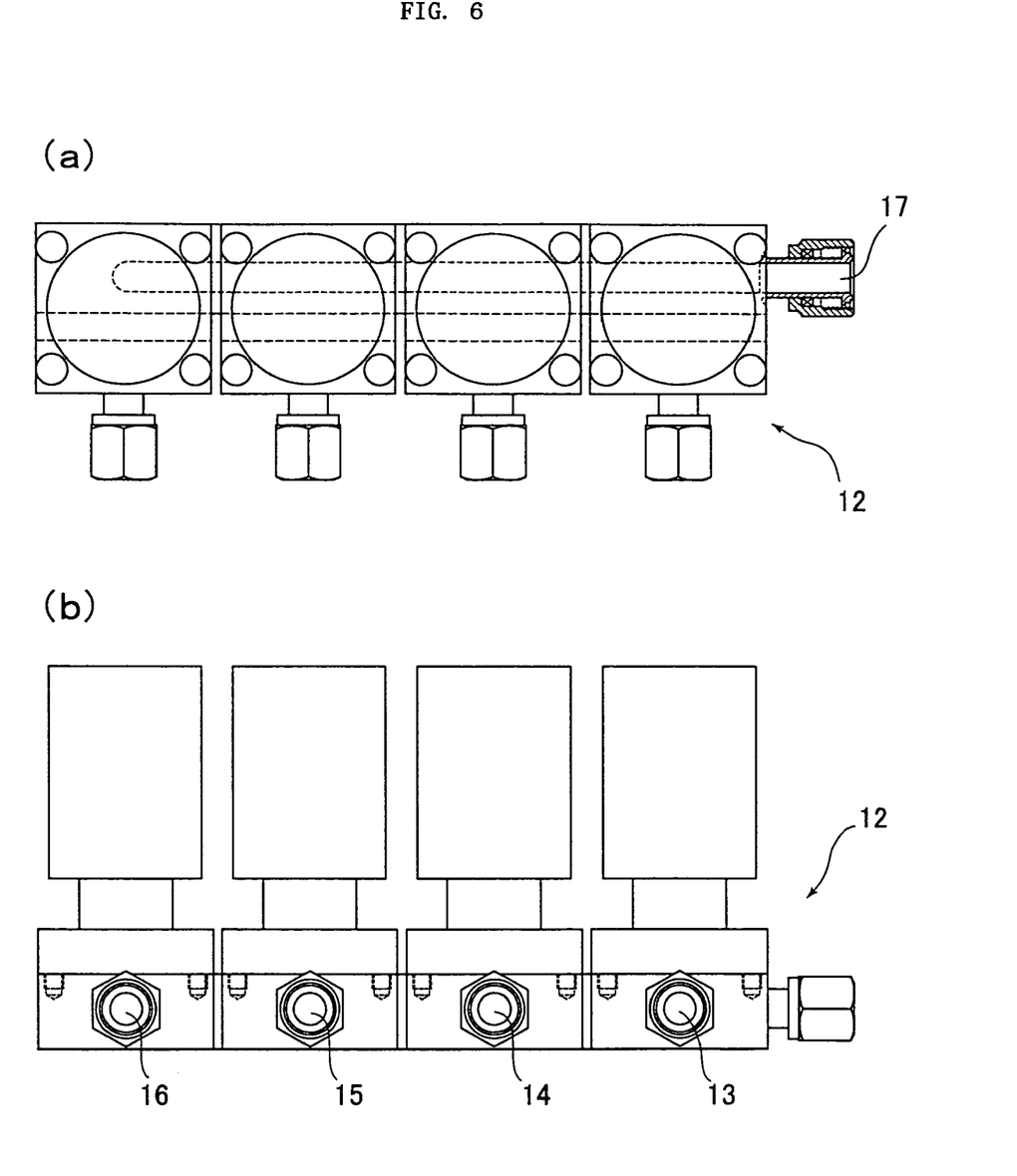
FIG. 6 illustrates another valve (a 4-gang valve) according to the present invention. (a) is its plan view and (b) is its front view.

FIG. 6 illustrates four of the afore-mentioned diaphragm valve coupled together, which is called a 4-gang valve 12. Each valve has its respective inlet flow passage 13, 14, 15 and 16 and is connected to an outlet flow passage 17.

The afore-mentioned 4-gang valve can be used when the vacuum exhaustion systems for four process chambers are assembled for the exhaustion. Any number of valves as connected can be freely for chosen for couplement.

EFFECTS OF THE INVENTION

In order to reduce the diameter of the vacuum exhaustion system pipings for making the vacuum exhaustion system small-sized and lowering the costs, it is imperative to prevent the dissociation and decomposition of the gases inside the vacuum exhaustion system, the corrosions inside the pipings, cloggings and valve seat leakages caused by the accumulation and adherence of the substances produced by the dissociation and decomposition of gases. To achieve the ends, baking for preventing the deposition and adherence of water, moisture and gases on the inner wall of the pipings is indispensable.

However, the temperature rise by baking causes a problem that the decomposition of gases is promoted because the temperature rise enhances the catalytic effects exerted by the metal part in the vacuum exhaustion system.

The present invention, using the aluminum passivation which is formed in a relatively simple way and at a low cost, can inhibit the catalytic effects which can enhance the dissociation (decomposition) of various gases used for the semi-conductor manufacturing even at the temperature of approx. 150° C. As a result, it is possible to provide a part or component, in particular a valve, suitable for reducing the diameter of the vacuum exhaustion system at a low cost which is free from the corrosions, cloggings, leakages and the likes caused by the accumulation of the substance produced the dissociation of gases, thereby reducing the diameter of the pipings for making the vacuum exhaustion system small-sized and lowering the costs.

Furthermore, by making the aluminum passivation more than 20 nm in thickness, excellent barrier effects against the underlying metal can be expected. In addition, it is possible to appropriately choose austenitic stainless steel containing some percent of aluminum, aluminum, aluminum alloys and the like for the base metal, which further lowers the costs for manufacturing the valve.

It makes the exhaustion more effective and the excessively large sized valve unnecessary to allow the valve flow passage to have the inside diameter which permits the fluid in the flow passage to form a viscous flow.

Furthermore, the inside diameter of the flow passage of the valve is less than 12 mm such that a compact-sized valve can be provided.

In addition, since the flow passage part of the valve can be heated to 150° C., it is possible to provide the valve which can be put to operation even if the vacuum exhaust system is subjected to the baking. Further, in case of the metal diaphragm valve, the heat-resistance and durability of the diaphragm are remarkably improved by coating only the diaphragm with fluorine-contained resin, thus resulting in the extended life of the valve.

As explained above, the present invention achieves excellent, practical effects.

What is claimed is:

1. A valve in a vacuum exhaustion system, the valve comprising:
    a first body having a valve seat formed on a bottom face of a valve chamber in communication with a fluid passage connected to a flow-in passage and a flow-out passage;
    a valve body permitted to rest on or move away from the valve seat, wherein the valve body is a metal diaphragm whose fluid-contacting parts are coated with fluorine-containing resin film;
    a driving means operating to allow the valve body to rest on or move away from the valve seat so the fluid passage is closed, or opened, for controlling fluid by allowing the valve body to rest on, or move away from, respectively, the valve seat; and
    an aluminum passivation applied at least on surfaces of the first body having contact with fluids and on an entire portion of the valve body that comes in contact with fluids, wherein the first body on which the aluminum passivation is applied comprises austenitic stainless steel containing 3-8 weight percent of aluminum, and
    wherein the aluminum passivation is applied on surfaces of the first body by heat treatment on the first body in order to prevent dissociation of fluid in a heated fluid passage of the valve and so that thickness of the aluminum passivation is not less than 20 nm, wherein the aluminum passivation is aluminum passivation containing $Al_2O_3$.

2. A valve in the vacuum exhaustion system as claimed in claim 1, wherein an inside diameter of the fluid passage in the valve is not more than 12 mm.

3. A valve in the vacuum exhaustion system as claimed in claim 1, wherein the valve is operable even when the vacuum exhaustion system is subject to baking so the fluid passage in the valve is heated to 150° C.

4. A valve for a vacuum exhaustion system as claimed in claim 1, wherein the fluorine-contained resin film is made of polytetrafluoroethylene resin, fluorinated ethylene-propylene copolymer, or tetrafluoroethylene-perfluoroalkylevinyl ether copolymer.

5. A valve in the vacuum exhaustion system as claimed in claim 1, wherein the flow passage in the valve has an inside diameter permitting fluids in the flow passage to form a viscous flow.

6. A valve in a vacuum exhaustion system, the valve comprising:
    a first body having a valve seat formed on a bottom face of a valve chamber in communication with a fluid passage connected to a flow-in passage and a flow-out passage, wherein an inside diameter of the fluid passage in the valve is not more than 12 mm;
    a valve body permitted to rest on or move away from the valve seat, wherein the valve body comprises a metal diaphragm whose fluid-contacting parts are coated with fluorine-containing resin films;
    a driving means operating to allow the valve body to rest on or move away from the valve seat so the fluid passage is closed, or opened, for controlling fluid by allowing the valve body to rest on, or move away from, respectively, the valve seat; and
    an aluminum passivation applied at least on surfaces of the first body having contact with fluids and on an entire portion of the valve body that comes in contact with fluids, wherein the surfaces of the first body on which the aluminum passivation is applied comprise austenitic stainless steel containing aluminum, and
    wherein the aluminum passivation is applied on surfaces of the first body by heat treatment on the first body in order to prevent dissociation of fluid in a heated fluid passage of the valve and so that thickness of the aluminum passivation is not less than 20 nm, wherein the aluminum passivation is aluminum passivation containing mainly $Al_2O_3$.

7. A valve in the vacuum exhaustion system as claimed in claim 6, wherein the valve is operable even when the vacuum exhaustion system is subject to baking so the flow passage in the valve is heated to 150° C.

8. A valve for a vacuum exhaustion system as claimed in claim 6, wherein the fluorine-contained resin film is made of polytetrafluoroethylene resin (PTFE), fluorinated ethylene-propylene copolymer (FEP), or tetrafluoroethylene-perfluoroalkylevinyl ether copolymer (PFA).

9. A valve in a vacuum exhaustion system, the valve comprising:
    a first body having a valve seat formed on a bottom face of a valve chamber in communication with a fluid passage connected to a flow-in passage and a flow-out passage;
    a valve body permitted to rest on or move away from the valve seat, wherein the valve body is a metal diaphragm whose fluid-contacting parts are coated with fluorine-containing resin film;
    a driving means operating to allow the valve body to rest on or move away from the valve seat so the fluid passage is closed, or opened, for controlling fluid by allowing the valve body to rest on, or move away from, respectively, the valve seat; and
    an aluminum passivation applied at least on surfaces of the first body having contact with fluids, wherein the first body on which the aluminum passivation is applied comprises austenitic stainless steel containing 3-8 weight percent of aluminum, and
    wherein the aluminum passivation is applied on surfaces of the first body by heat treatment on the first body in order to prevent dissociation of fluid in a heated fluid passage of the valve and so that thickness of the aluminum passivation is not less than 20 nm, wherein the aluminum passivation is aluminum passivation containing $Al_2O_3$.

10. A valve in a vacuum exhaustion system, the valve comprising:
    a first body having a valve seat formed on a bottom face of a valve chamber in communication with a fluid passage connected to a flow-in passage and a flow-out passage, wherein an inside diameter of the fluid passage in the valve is not more than 12 mm;
    a valve body permitted to rest on or move away from the valve seat, wherein the valve body comprises a metal diaphragm whose fluid-contacting parts are coated with fluorine-containing resin films;
    a driving means operating to allow the valve body to rest on or move away from the valve seat so the fluid passage is closed, or opened, for controlling fluid by allowing the valve body to rest on, or move away from, respectively, the valve seat; and
    an aluminum passivation applied at least on surfaces of the first body having contact with fluids, wherein the surfaces of the first body on which the aluminum passivation is applied comprise austenitic stainless steel containing aluminum, and
    wherein the aluminum passivation is applied on surfaces of the first body by heat treatment on the first body in order to prevent dissociation of fluid in a heated fluid passage of the valve and so that thickness of the aluminum passivation is not less than 20 nm, wherein the aluminum passivation is aluminum passivation containing mainly $Al_2O_3$.

* * * * *

UNITED STATES PATENT AND TRADEMARK OFFICE
CERTIFICATE OF CORRECTION

PATENT NO. : 7,472,887 B2
APPLICATION NO. : 10/545672
DATED : January 6, 2009
INVENTOR(S) : Tadahiro Ohmi et al.

It is certified that error appears in the above-identified patent and that said Letters Patent is hereby corrected as shown below:

Title Page (73) Assignee: FUJIKIN INCORPORATED, Osaka (JP)

In the section of the "Assignee", there is only one Assignee cited.

The second assignee has been omitted by the U.S. Patent Office.

After the first Assignee, please add the second assignee as follows:

Tadahiro OHMI, Sendai-shi, JAPAN

Signed and Sealed this

Twenty-eighth Day of April, 2009

JOHN DOLL
*Acting Director of the United States Patent and Trademark Office*